F. CLAYTON.
SELF LOADING AND UNLOADING MOTOR TRUCK.
APPLICATION FILED JULY 10, 1914.

1,142,672.

Patented June 8, 1915.
3 SHEETS—SHEET 1.

Inventor
F. Clayton,

Witnesses

By Victor J. Evans
Attorney

F. CLAYTON.
SELF LOADING AND UNLOADING MOTOR TRUCK.
APPLICATION FILED JULY 10, 1914.

1,142,672.

Patented June 8, 1915.
3 SHEETS—SHEET 2.

Witnesses

Inventor
F. Clayton,
By Victor J. Evans
Attorney

F. CLAYTON.
SELF LOADING AND UNLOADING MOTOR TRUCK.
APPLICATION FILED JULY 10, 1914.

1,142,672.

Patented June 8, 1915.

Inventor
F. Clayton,
By Victor J. Evans
Attorney

Witnesses

UNITED STATES PATENT OFFICE.

FRED CLAYTON, OF FULLERTON, LOUISIANA.

SELF LOADING AND UNLOADING MOTOR-TRUCK.

1,142,672.

Specification of Letters Patent.

Patented June 8, 1915.

Application filed July 10, 1914. Serial No. 850,208.

*To all whom it may concern:*

Be it known that I, FRED CLAYTON, a citizen of the United States, residing at Fullerton, in the parish of Vernon and State of Louisiana, have invented new and useful Improvements in Self Loading and Unloading Motor-Trucks, of which the following is a specification.

This invention relates to self-loading and unloading motor trucks, the object in view being to produce a truck the body of which is open at both ends enabling the truck to be loaded and unloaded from either end and being especially adapted for handling lumber and other materials or articles of kindred shape and form such as railroad rails and the like.

A further object of the invention is to provide a truck of the character referred to with load handling means such as load supporting rollers and a winding drum and cable, combined with an auxiliary motor for use in loading and unloading, together with means for causing said motor to drive the loading and unloading rollers in either direction.

A further object of the invention is to arrange all of the controls for the propelling and load handling motors and the steering mechanism, clutch mechanism, brake and other parts, entirely at one side of the machine and outside of the vertical lines of the body, the same being arranged in convenient proximity to the operator's seat which is also located within the lines of the body and above the loading space.

With the above and other objects in view, the invention consists in the novel construction, combination and arrangement of parts, as herein described, illustrated and claimed.

Figure 1:
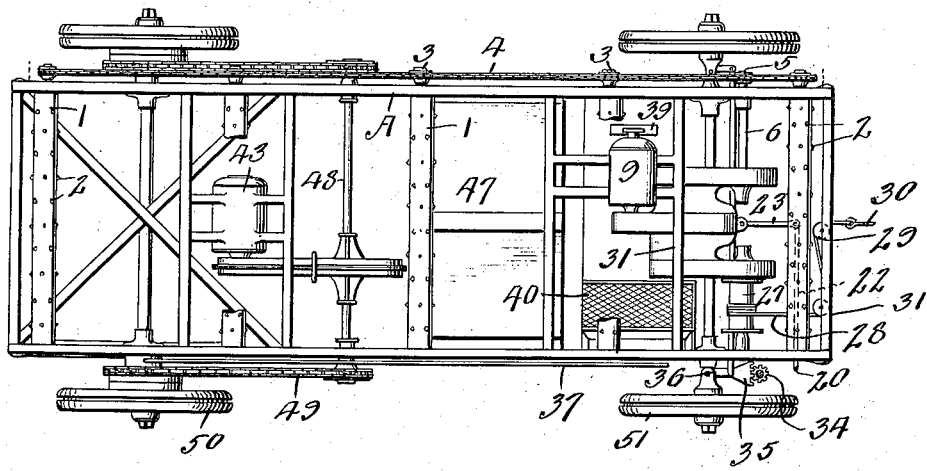
Figure 2:
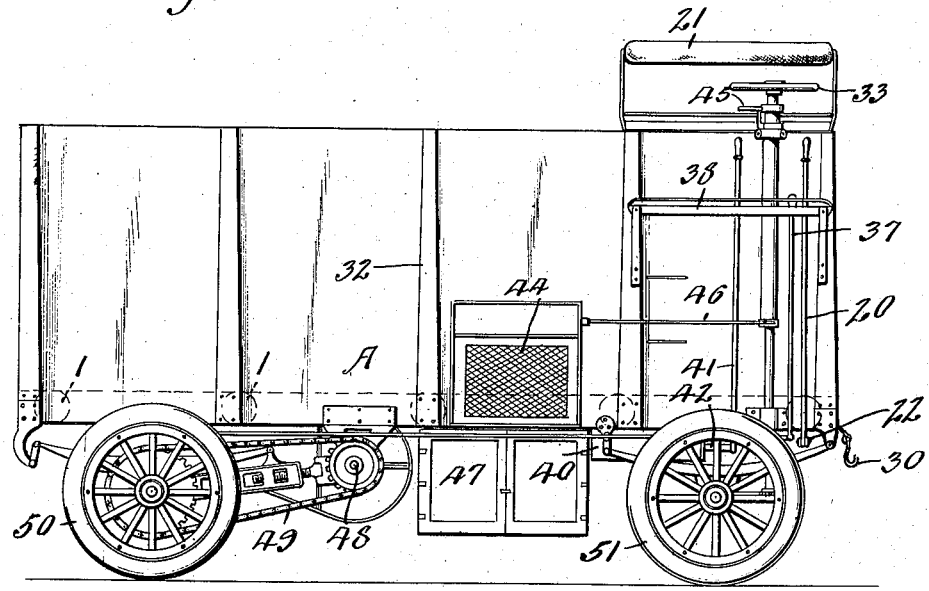
Figure 3:
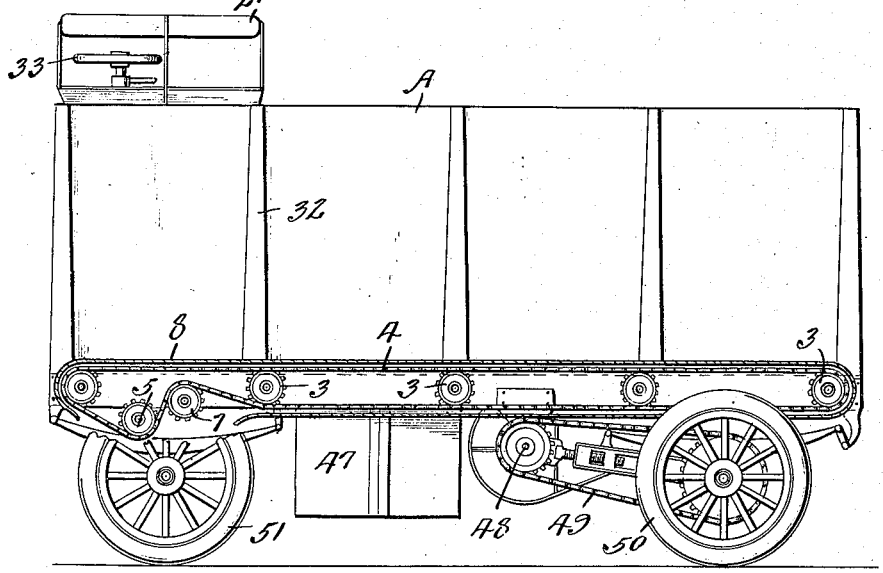
Figure 5:
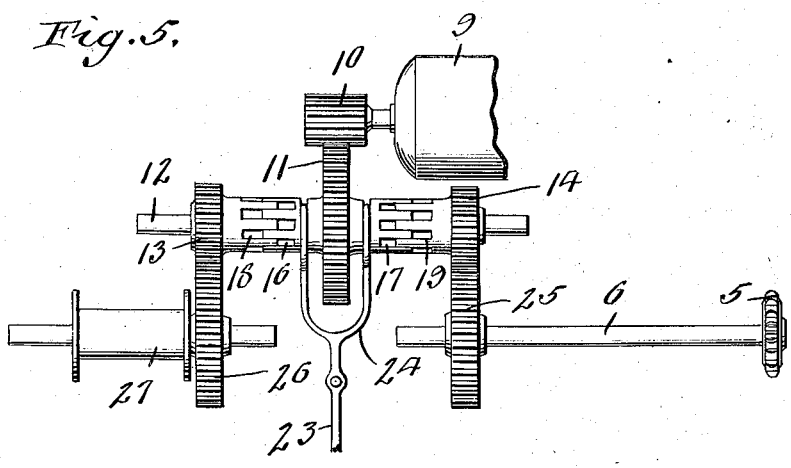
Figure 4:
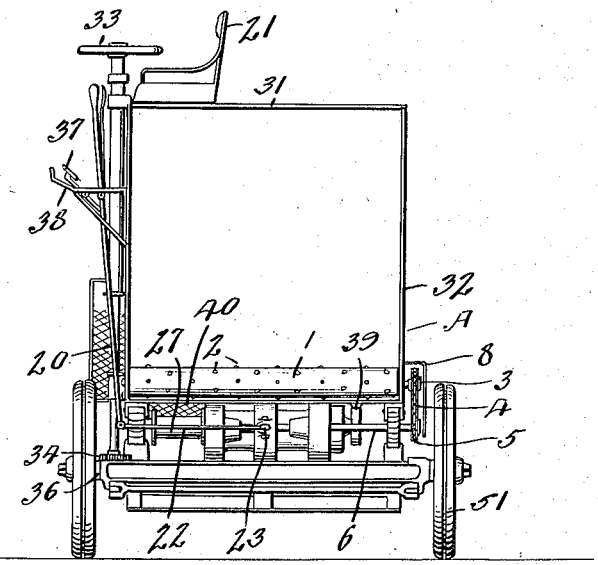
Figure 6:
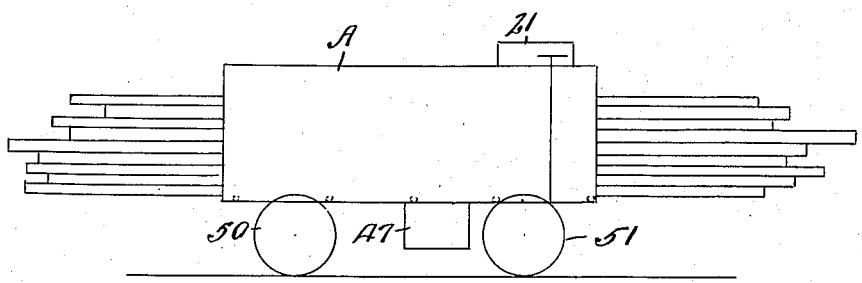
Figure 7:
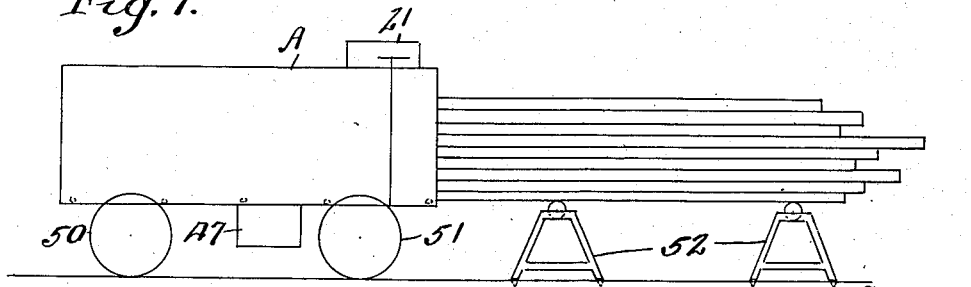

In the accompanying drawings:—Figure 1 is a plan view of a truck embodying the present invention. Fig. 2 is a side elevation of the same. Fig. 3 is a side elevation looking toward the opposite side of the truck. Fig. 4 is a front elevation of the truck. Fig. 5 is a detail plan view of the load handling clutch mechanism, and the auxiliary motor for operating the same. Fig. 6 is a diagrammatic side elevation showing the truck loaded. Fig. 7 is a similar view showing the operation of loading and unloading the truck.

Referring to the drawings A generally designates the body of the truck, the floor of which is composed of a longitudinal series of load supporting rollers 1, each of which, in the preferred embodiment of this invention, is provided with spikes 2 to obtain a positive hold on the load for the purpose of loading or unloading the same.

All of these rollers 1 are preferably located in the same horizontal plane as indicated in Fig. 2. Each of said rollers is provided at one extremity thereof with a sprocket wheel 3. All of these sprocket wheels are actuated by a single endless sprocket chain 4 which passes around and is actuated by a driving sprocket wheel 5 on a sprocket shaft 6 as shown in Figs. 3 and 5. The chain 4 also passes around an idler chain tightening sprocket wheel 7 which may be adjusted to keep the chain 4 under proper tension for driving all of the sprocket wheels 3. 8 designates a chain guard or shield which covers in and incloses most of the sprocket wheels hereinabove referred to as well as the sprocket chain 4 as indicated in Fig. 3.

The auxiliary or load handling motor is indicated at 9 and shown in Fig. 5. The shaft of said motor is provided with a pinion 10 which meshes with and drives a clutch gear 11 shiftable longitudinally of a pinion shaft 12 carrying two pinions 13 and 14 normally loose thereon but adapted to be locked to the shaft 12 either one at a time or both at a time by shifting the clutch gear 11 which is provided at its opposite sides with clutch faces 16 and 17 adapted to engage corresponding clutch faces 18 and 19 on the adjacent sides of the pinions 13 and 14. The teeth of said clutch faces are of such length that, as previously indicated, both of the pinions 14 and 13 may be simultaneously engaged with the clutch gear 11 or only one at a time.

The clutch gear is shifted to one of its three working positions by means of a manually operated clutch lever 20 arranged for convenient operation adjacent to the operator's seat 21, said lever 20 being fulcrumed on the body of the machine, at one side thereof as shown in Fig. 4, and being connected by a rod 22 to a lever 23 provided with a fork 24 which engages the hub of the clutch gear 11 to shift the latter longitudinally of the shaft 12 in either direction.

The pinion 14 meshes with a spur gear 25 on the sprocket shaft 6 for imparting motion to the chain 4 and rollers 1. The pinion 13 meshes with and drives a spur gear 26 on the shaft of a winding drum 27 carrying a cable 28 which passes around a sheave 29 and is provided at its free extremity with a hook 30, said cable being also used for handling the load as will hereinafter appear.

The driver's seat 21, it will be noted by reference to Fig. 4, is located inside of the lines of the body A and above the loading space over the rollers 1, said seat being supported upon horizontal cross bars 31 connecting the upper extremities of the vertical bars or stanchions 32 of the body A. The seat 21 faces to the side of the truck and the hand controlled steering wheel 33 is arranged directly in front of the seat or to one side of the body as best illustrated in Fig. 4, the shaft of said steering wheel being shown as provided with a pinion 34 which meshes with a sector 35 on one of the steering knuckles 36 of the machine.

37 designates the foot brake lever having suitable connection with the brake and arranged adjacent to a foot rest 38.

39 designates a magnetic brake which coöperates with the auxiliary motor 9 and prevents rotation of the rollers 1 after the truck has been loaded.

40 designates the controller for the load shifting motor, said controller being operated by a hand lever 41 arranged at the side of the body and in front of the operator's seat 21 and connected to the controller 40 by means of a rod or link 42.

The truck propelling motor is shown at 43, 44 designating the controller for said motor which is operated by a hand lever 45 on the steering column as shown in Fig. 2, said lever 45 being connected with the controller 44 by means of a rod 46.

47 designates the battery compartment which together with the motors 9 and 43 is located below the plane of the loading and unloading rollers 1. The motor 43 is geared to a countershaft 48 which is connected by sprocket chains 49 to the rear driving wheels 50, the steering wheels being indicated at 51.

From the foregoing description taken in connection with the accompanying drawings it will now be seen that with the aid of one or more roller stands 52 as shown in the diagrammatic side elevation, Fig. 7, a pile of lumber, rails, or the like may be loaded from said roller stands onto the truck or unloaded upon said roller stands in the manner clearly indicated in Figs. 6 and 7 and it will also be seen that either end of the truck may be driven up to the load to be placed thereon or to the stands upon which the load is to be deposited. In loading the truck, the truck is advanced to the load until the end roller passes under the projecting end of the pile of material on the roller stands 52. The rollers are then driven in the proper direction by means of the auxiliary motor, the clutch lever being first placed in the proper position to drive said rollers. The teeth on the rollers grip the under side of the load and cause it to be drawn onto the truck. In unloading, the operation just described is of course reversed. Where necessary, the cable 28 may be passed around the load and the clutch shifted so as to throw the winding drum into operation. This drum and cable may be used either for loading or unloading. The cable may also be used to pull the machine out of bad places.

As a result of the construction and arrangement above described, much valuable time is saved in loading and unloading the truck, due in a great measure to the fact that it is not necessary to turn the truck around as it may be loaded from either end and the load may be evenly divided on all the wheels. Any length of load may be hauled without overbalancing the rear end of the truck as is now frequently done. The construction also enables a comparatively short radius and wheel base to be employed. By arranging the operator's seat at the place shown and described, free space is left for the load and the operator by turning his head to one side or the other may properly steer the machine with either end forward.

The controls are all located at one side of the body of the machine and do not interfere with the loading space. By controls is meant the usual manually operable means for controlling the motive power, clutch, steering and braking mechanisms.

What I claim is:—

1. In a motor truck, a body open at both ends adapting the same to be loaded and unloaded at either end, loading and unloading rollers forming supporting means for the load, a motor located beneath the plane of said rollers and geared thereto for driving the same, an elevated operator's seat supported above the loading space, and manually operable controls, substantially as described, adjacent to said seat and located at one side of the body and loading space.

2. In a motor truck, a body open at both ends adapting the same to be loaded and unloaded at either end, loading and unloading spiked rollers forming supporting means for the load, a motor located beneath the plane of said rollers and geared thereto for driving the same, an elevated operator's seat supported above the loading space, and manually operable controls, substantially as described, adjacent to said seat and located at one side of the body and loading space.

3. In a motor truck, a body open at both ends adapting the same to be loaded and unloaded at either end, a propelling motor and a load handling motor both located under the truck floor, an operator's seat arranged above the loading space, and manually operable controls for both motors located at one side of the body and outside of the lines of the body and adjacent to the operator's seat.

4. In a motor truck, a body open at both ends adapting the same to be loaded and unloaded at either end, loading and unloading rollers forming supporting means for the load, a motor located beneath the plane of said rollers and geared thereto for driving the same, clutch mechanism for throwing said rollers into and out of gear, an elevated operator's seat supported above the loading space, and manually operable controls, substantially as described, adjacent to said seat and located at one side of the body and loading space.

5. In a motor truck, a body open at both ends adapting the same to be loaded and unloaded at either end, loading and unloading rollers forming supporting means for the load, a winding drum and cable, a motor located beneath the plane of said rollers and geared thereto and to said drum for driving the same, clutch mechanism for throwing said rollers and drum either or both at a time into gear with said motor, an elevated operator's seat supported above the loading space, and manually operable controls, substantially as described, adjacent to said seat and located at one side of the body and loading space.

6. In a motor truck, a body open at both ends adapting the same to be loaded and unloaded at either end, load supporting and shifting rollers journaled in the truck frame and forming the floor thereof, a roller-actuating motor located beneath the plane of said rollers, an operator's seat arranged within the vertical lines of the body and above the loading space, and motor controls arranged outside of the side line of the body by means of which the motor may be caused to turn the rollers in either direction.

7. In a motor truck, a body open at both ends adapting the same to be loaded and unloaded at either end, load supporting and shifting rollers journaled in the truck frame and forming the floor thereof, a roller-actuating motor located beneath the plane of said rollers, a truck propelling motor also located beneath the plane of said rollers, an operator's seat arranged within the vertical lines of the body and above the loading space, and motor controls arranged outside of the side line of the body by means of which the roller-actuating motor may be caused to turn the rollers in either direction.

In testimony whereof I affix my signature in presence of two witnesses.

FRED CLAYTON.

Witnesses:
M. M. REYNOLDS,
R. H. IRVING.